(12) United States Patent
Campbell et al.

(10) Patent No.: US 10,970,263 B1
(45) Date of Patent: Apr. 6, 2021

(54) COMPUTER SYSTEM AND METHOD OF INITIATIVE ANALYSIS USING OUTLIER IDENTIFICATION

(71) Applicant: APPLIED PREDICTIVE TECHNOLOGIES, INC., Arlington, VA (US)

(72) Inventors: Jeffrey Campbell, Arlington, VA (US); Kai Fei, Arlington, VA (US); Stephen Kent, Philadelphia, PA (US); Ameya Pathare, Washington, DC (US)

(73) Assignee: Applied Predictive Technologies, Inc., Arlington, VA (US)

( * ) Notice: Subject to any disclaimer, the term of this patent is extended or adjusted under 35 U.S.C. 154(b) by 186 days.

(21) Appl. No.: 16/173,980

(22) Filed: Oct. 29, 2018

Related U.S. Application Data

(63) Continuation of application No. 14/877,815, filed on Oct. 7, 2015, now Pat. No. 10,127,255.

(51) Int. Cl.
*G06F 16/22* (2019.01)
*G06F 16/245* (2019.01)

(52) U.S. Cl.
CPC ........ *G06F 16/2228* (2019.01); *G06F 16/245* (2019.01)

(58) Field of Classification Search
CPC ........................... G06F 16/2228; G06F 16/245

USPC .......................................................... 707/746
See application file for complete search history.

(56) References Cited

U.S. PATENT DOCUMENTS

| | | | |
|---|---|---|---|
| 9,165,270 B2 | 10/2015 | Dickinson et al. | |
| 2004/0039548 A1 | 2/2004 | Selby et al. | |
| 2005/0004830 A1* | 1/2005 | Rozell .................... | G06Q 30/02 705/7.34 |
| 2007/0239636 A1 | 10/2007 | Tang et al. | |
| 2008/0167941 A1* | 7/2008 | Kagarlis ................ | G06Q 40/00 705/35 |
| 2008/0168002 A1 | 7/2008 | Kagarlis et al. | |
| 2008/0294996 A1* | 11/2008 | Hunt ..................... | G06Q 30/02 715/739 |
| 2011/0307521 A1 | 12/2011 | Slezak et al. | |
| 2012/0303414 A1 | 11/2012 | Dodge et al. | |
| 2013/0007003 A1 | 1/2013 | Shyr et al. | |
| 2014/0012862 A1 | 1/2014 | Kawamoto et al. | |

\* cited by examiner

*Primary Examiner* — Evan Aspinwall
(74) *Attorney, Agent, or Firm* — Foley & Lardner LLP

(57) ABSTRACT

The computer system and method described herein attempt to address the deficiencies by analyzing all relevant data points for each test and control location collectively determine outliers and then exclude the individual outlier data points from the data when analyzing an initiative during a relevant test period. Rather than exclude outliers at the site level, the particular time increment having the outlier data can be extracted and the site can remain in the analysis.

18 Claims, 11 Drawing Sheets

|          | Sales Data | | | | | | | | |
|----------|---|---|---|---|---|---|---|---|---|
| Location | Pre Period Daily Average 215 | March 1 | March 2 | March 3 | March 4 | March 5 | March 6 | March 7 | Post Period Daily Average 220 |
| Test 201 | 10100 | 10290 | 10300 | 10260 | 10400 | 14020 | 10370 | 10320 | 10851 |
| Test 202 | 4060 | 4190 | 4220 | 4240 | 4350 | 6380 | 4290 | 4160 | 4547 |
| Test 203 | 4430 | 4600 | 4620 | 4570 | 4750 | 6800 | 4720 | 4660 | 4960 |
| Test 204 | 4280 | 4350 | 4390 | 4350 | 4520 | 6550 | 4480 | 4400 | 4720 |
| Test 205 | 4240 | 4420 | 4410 | 2710 | 4650 | 6680 | 4600 | 4500 | 4567 |
| Control 206 | 4250 | 4110 | 4130 | 4070 | 4240 | 6260 | 4200 | 4140 | 4450 |
| Control 207 | 4280 | 4220 | 4220 | 4220 | 4340 | 6360 | 4300 | 4260 | 4560 |
| Control 208 | 4210 | 4140 | 4170 | 4190 | 4300 | 6330 | 4240 | 4110 | 4497 |
| Control 209 | 4220 | 4220 | 4230 | 4190 | 4330 | 6350 | 4300 | 4250 | 4553 |
| Control 210 | 4340 | 4260 | 4300 | 4260 | 4430 | 6460 | 4390 | 4210 | 4616 |
| Control 211 | 4310 | 4020 | 4280 | 4020 | 4360 | 6120 | 6080 | 4020 | 4700 |
| Control 212 | 4500 | 4400 | 4390 | 4390 | 4630 | 6650 | 4560 | 4470 | 4784 |

FIG. 2

| Location | Sales Data | | | | | | | |
|---|---|---|---|---|---|---|---|---|
| | Pre Period Daily Average 215 | 1-Mar | 2-Mar | 3-Mar | 4-Mar | 5-Mar | 6-Mar | 7-Mar |
| Test 201 | 0.93079 | 0.9483 | 0.949221 | 0.945535 | 0.958437 | 1.292047 | 0.955672 | 0.951064 |
| Test 202 | 0.892896 | 0.921487 | 0.928084 | 0.932483 | 0.956675 | 1.403123 | 0.943479 | 0.914889 |
| Test 203 | 0.893145 | 0.927419 | 0.931452 | 0.921371 | 0.957661 | 1.370968 | 0.951613 | 0.939516 |
| Test 204 | 0.90678 | 0.92161 | 0.930085 | 0.92161 | 0.957627 | 1.387712 | 0.949153 | 0.932203 |
| Test 205 | 0.928399 | 0.967813 | 0.965623 | 0.593387 | 1.018174 | 1.462667 | 1.007226 | 0.98533 |
| Control 206 | 0.955056 | 0.923596 | 0.92809 | 0.914607 | 0.952809 | 1.406742 | 0.94382 | 0.930337 |
| Control 207 | 0.938596 | 0.925439 | 0.925439 | 0.925439 | 0.951754 | 1.394737 | 0.942982 | 0.934211 |
| Control 208 | 0.93618 | 0.920614 | 0.927285 | 0.931732 | 0.956193 | 1.407605 | 0.942851 | 0.913943 |
| Control 209 | 0.926861 | 0.926861 | 0.929058 | 0.920272 | 0.951021 | 1.394685 | 0.944432 | 0.93345 |
| Control 210 | 0.940208 | 0.922877 | 0.931542 | 0.922877 | 0.959705 | 1.39948 | 0.95104 | 0.912045 |
| Control 211 | 0.917021 | 0.855319 | 0.910638 | 0.855319 | 0.92766 | 1.302128 | 1.293617 | 0.855319 |
| Control 212 | 0.940635 | 0.919732 | 0.917642 | 0.917642 | 0.967809 | 1.39005 | 0.953177 | 0.934365 |
| Average | 0.925547 | 0.923422 | 0.93118 | 0.891856 | 0.959627 | 1.384329 | 0.981589 | 0.928056 |

*FIG. 3*

|  | Sales Data | | | | | | | |
| --- | --- | --- | --- | --- | --- | --- | --- | --- |
| Location | Pre Period Daily Average 215 | 1-Mar | 2-Mar | 3-Mar | 4-Mar | 5-Mar | 6-Mar | 7-Mar |
| Test 201 | 0.005664 | 0.026941 | 0.019375 | 0.060188 | -0.00124 | -0.06666 | -0.0264 | 0.024792 |
| Test 202 | -0.03528 | -0.0021 | -0.00332 | 0.045553 | -0.00308 | 0.013577 | -0.03882 | -0.01419 |
| Test 203 | -0.03501 | 0.004329 | 0.000292 | 0.033094 | -0.00205 | -0.00965 | -0.03054 | 0.012349 |
| Test 204 | -0.02028 | -0.00196 | -0.00118 | 0.033362 | -0.00208 | 0.002444 | -0.03304 | 0.004469 |
| Test 205 | 0.003081 | 0.048072 | 0.036989 | -0.33466 | 0.06101 | 0.056589 | 0.026118 | 0.061713 |
| Control 206 | 0.031883 | 0.000188 | -0.00332 | 0.025509 | -0.00711 | 0.016191 | -0.03848 | 0.002458 |
| Control 207 | 0.014099 | 0.002184 | -0.00617 | 0.037654 | -0.0082 | 0.007519 | -0.03933 | 0.006632 |
| Control 208 | 0.011488 | -0.00304 | -0.00418 | 0.044711 | -0.00358 | 0.016814 | -0.03946 | -0.01521 |
| Control 209 | 0.00142 | 0.003724 | -0.00228 | 0.031862 | -0.00897 | 0.007481 | -0.03785 | 0.005813 |
| Control 210 | 0.01584 | -0.00059 | 0.000389 | 0.034782 | 8.15E-05 | 0.010945 | -0.03112 | -0.01725 |
| Control 211 | -0.00921 | -0.07375 | -0.02206 | -0.04097 | -0.03331 | -0.05938 | 0.317881 | -0.07838 |
| Control 212 | 0.016302 | -0.004 | -0.01454 | 0.028913 | 0.008526 | 0.004133 | -0.02894 | 0.006798 |

*FIG. 4*

| Location | Pre period Daily Average | Post Period Daily Average | Change | Post Period Daily Average Excluding Outlier | Change |
|---|---|---|---|---|---|
| Test 201 | 10100 | 10851 | 7.44% | 10851 | 7.44% |
| Test 202 | 4060 | 4547 | 12.00% | 4547 | 12.00% |
| Test 203 | 4430 | 4960 | 11.96% | 4960 | 11.96% |
| Test 204 | 4280 | 4720 | 10.28% | 4720 | 10.28% |
| Test 205 | 4240 | 4567 | 7.72% | 4877 | 15.02% |
| Test Group | 5422 | 5929 | 9.35% | 5991 | 10.50% |

| | | | | | |
|---|---|---|---|---|---|
| Control 206 | 4250 | 4450 | 4.71% | 4450 | 4.71% |
| Control 207 | 4280 | 4560 | 6.54% | 4560 | 6.54% |
| Control 208 | 4210 | 4497 | 6.82% | 4497 | 6.82% |
| Control 209 | 4220 | 4553 | 7.89% | 4553 | 7.89% |
| Control 210 | 4340 | 4616 | 6.35% | 4616 | 6.35% |
| Control 211 | 4310 | 4700 | 9.05% | 4470 | 3.71% |
| Control 212 | 4500 | 4784 | 6.32% | 4784 | 6.32% |
| Control Group | 4301 | 4594 | 6.81% | 4584 | 6.57% |

| | Including Outliers | Excluding Outliers |
|---|---|---|
| Net Effect of Business Initiative | 2.38% | 3.68% |

```
┌─────────────────────────────────────────────────────────────────────────────┐
│ Compile data set from data store of performance information data for locations in a time period 910 │
└─────────────────────────────────────────────────────────────────────────────┘
                                       ↓
              ┌──────────────────────────────────────────────┐
              │ Analytics server normalizes data set 920      │
              └──────────────────────────────────────────────┘
                                       ↓
         ┌────────────────────────────────────────────────────────┐
         │ Analytics server generates first index value for each location 930 │
         └────────────────────────────────────────────────────────┘
                                       ↓
     ┌──────────────────────────────────────────────────────────────────┐
     │ Analytics server generates second index value for each discrete time period 940 │
     └──────────────────────────────────────────────────────────────────┘
                                       ↓
     ┌──────────────────────────────────────────────────────────────────┐
     │ Analytics server executes outlier algorithm to determine discrete time │
     │ periods representing an outlier 950                               │
     └──────────────────────────────────────────────────────────────────┘
                                       ↓
         ┌────────────────────────────────────────────────────────┐
         │ Analytics server generates a blacklist file representing outlier data 960 │
         └────────────────────────────────────────────────────────┘
                                       ↓
              ┌──────────────────────────────────────────────┐
              │ Analytics server selects data without outlier data 970 │
              └──────────────────────────────────────────────┘
                                       ↓
       ┌──────────────────────────────────────────────────────────┐
       │ Analytics server modifies algorithm based on data without outlier data 980 │
       └──────────────────────────────────────────────────────────┘
                                       ↓
       ┌──────────────────────────────────────────────────────────┐
       │ Analytics server executes modified algorithm to analyze an initiative 990 │
       └──────────────────────────────────────────────────────────┘
```

*FIG. 9*

Select Time Period: ___

Select Number of Test Locations: ___

Select Number of Control Locations: ___

Perform Test Versus Control Analysis

*FIG. 10*

COMPUTER SYSTEM AND METHOD OF INITIATIVE ANALYSIS USING OUTLIER IDENTIFICATION

CROSS REFERENCE TO RELATED APPLICATIONS

This application is a continuation application of U.S. patent application Ser. No. 14/877,815 filed on Oct. 7, 2015, which is hereby incorporated reference in its entirety.

TECHNICAL FIELD

This invention relates generally to a computer system and method for dynamically excluding outlier data points during analysis of an initiative.

BACKGROUND

Many businesses have realized that they need to test their initiatives before rolling out the initiatives to their entire business networks. In conducting those tests, they often rely on test versus control analysis, where the business initiative is implemented at a small group of locations within their business network, and then the performance of those locations is analyzed against the performance of a set of "control" locations intended to match the test locations as closely as possible.

To get a clear understanding of the impact of the changes on the test sites, it becomes critical to compare the test sites with control sites where the same changes have not been made. These control sites should be as similar as possible to the test sites in order to lower the measurement error.

The business initiatives may intend to increase profits by a small margin—sometimes less than 2% or 3%. For a retail establishment, an increase in profits by just a few percentage points can have important impacts on the overall performance of the business. Indeed, a 1% increase in profits for a retailer with $2 billion in profit would yield $20 million, a result that could pay for the costs of the initiative many times over.

As a result, it is important to have an accurate reading of the test of the initiative and to ensure that strange or extraneous occurrences that impact a test or control location's sales or profits during the test period do not unduly influence the overall analysis of the test.

Conventionally, if there is a test or control location that experiences a extraneous occurrence, such as an extended closure due to a hurricane, the impact on the data from that location may result in all of the performance data for that test period being considered an "outlier," and the entire location will be excluded from the analysis. Excluding the entire location from the analysis may result in losing valuable data points associated with time periods where the extraneous occurrence did not have an impact on that excluded location and where the location did not exhibit outlier behavior. A user may not be able to accurately identify an outlier, or the user may not be able to identify every outlier.

Another problem can occur when a test or control location is subject to an extraneous occurrence that may affect one or more days within a test period, such as police activity near the location that curtails customer traffic to the location over a day or more, but the overall effect of that occurrence is not significant enough to make the overall data associated with the location during the test period appears as an outlier, even if the extraneous occurrence had a true impact on the location's performance. In this situation, an analysis of the test period might be inaccurate. If the extraneous event depressed sales in a test location, the results of the test might not show the true increase (or decrease) in sales attributable to the test.

Conventional solutions employ a computer system that uses a filter that excludes data points beyond a predetermined threshold. This automatic exclusion of data based upon a filter results in at least two problems. First, the data may actually be significant data that should be included in the analysis. For example, a promotion at a store may have a lot of success, which appears as a spike in the data, but should be included in the analysis. Second, a threshold for one location may not be an appropriate threshold for another location. For example, a store in an urban environment may have a higher magnitude of sales than a store in a rural environment, so a threshold for the urban store should be higher than a threshold of the rural store.

In order to address the deficiencies with these conventional solutions, a user must specially program the computer system to accommodate for different scenarios. This special programming relies upon the user's intuition to identify potential issues (e.g., reasons for sharply increased or decreased performance). Aside from being inefficient due to the high volume of data, an algorithm based upon a user's intuition is not accurate enough.

SUMMARY

The computer system and method described herein attempt to address the deficiencies by analyzing all relevant data points for each test and control location collectively determine outliers and then exclude the individual outlier data points from the data when analyzing an initiative during a relevant test period. Rather than exclude outliers at the site level, the particular time increment having the outlier data can be extracted and the site can remain in the analysis.

In one embodiment, a data store containing data, for performance information data for each of a plurality of locations, wherein the performance information data is arranged in discrete time periods; and an analytics server coupled to the data store and programmed to: compile a data set from the data store of performance information data for a plurality of locations within a selected time period, wherein the performance information data is arranged in discrete time periods within the selected time period; generate a first index value for the performance information data of the data set for each location based on a comparison of the performance information data to an average for each location; generate a second index value for the performance information data based upon a comparison of the first index value to an average for the time period; execute an outlier algorithm to determine any discrete time period having performance information data that represents an outlier; generate a blacklist file representing each discrete time period in the data set having performance information data that represents an outlier; select a new data set based upon a query of the data store for performance information data during the discrete time periods during the selected time period that are not listed on the blacklist file as representing an outlier; modify an algorithm for analyzing an initiative based upon the selection of the new data set to exclude any discrete time period where the performance information data represents an outlier; execute the modified algorithm to analyze the initiative at the plurality of locations; and generate for display on a client computing device a user interface having data representing the analysis of the initiative at the plurality of locations.

In another embodiment, a computer-implemented method comprises compiling, by an analytics server, a data set from the data store of performance information data for a plurality of locations within a selected time period, wherein the performance information data is arranged in discrete time periods within the selected time period; generating, by the analytics server, a first index value for the performance information data of the data set for each location based on a comparison of the performance information data to an average for each location; generating, by the analytics server, a second index value for the performance information data based upon a comparison of the first index value to an average for the time period; executing, by the analytics server, an outlier algorithm to determine any discrete time period having performance information data that represents an outlier; generating, by the analytics server, a blacklist file representing each discrete time period in the data set having performance information data that represents an outlier; selecting, by the analytics server, a new data set based upon a query of the data store for performance information data during the discrete time periods during the selected time period that are not listed on the blacklist file as representing an outlier; modifying, by the analytics server, an algorithm for analyzing an initiative based upon the selection of the new data set to exclude any discrete time period where the performance information data represents an outlier; executing, by the analytics server, the modified algorithm to analyze the initiative at the plurality of locations; and generating, by the analytics server, for display on a client computing device a user interface having data representing the analysis of the initiative at the plurality of locations.

In yet another embodiment, a computer-implemented method comprises receiving, by an analytics server, a message from a user computing device requesting analysis of an initiative based on performance information data; storing, by the analytics server, performance information data for a plurality of locations in a database; identifying, by the analytics server, a plurality of test locations and control locations selected from the plurality of locations; identifying, by the analytics server, an experimental time period during which an experiment has been conducted at the test locations; compiling, by the analytics server, a data set comprising performance information data for each identified test location and control location during the experimental time period, wherein the data set comprises the performance data in discrete time periods within the experimental time period; generating, by the analytics server, a first index for the performance information data in the data set for each location; generating, by the analytics server, a second index for the performance information data in the data set for each discrete time period; executing, by the analytics server, an algorithm to determine if the performance information data with the discrete time periods represents an outlier; analyzing, by the analytics server, the initiative at the test locations against the control locations during the experimental time period without regard to any discrete time period that has performance information data representing an outlier; and presenting, by the analytics server, results of the analyzed initiative for display on a user interface of the user computing device.

Additional features and advantages of an embodiment will be set forth in the description which follows, and in part will be apparent from the description. The objectives and other advantages of the invention will be realized and attained by the structure particularly pointed out in the exemplary embodiments in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The methods, systems and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIG. 2 shows an exemplary data set according to an exemplary embodiment.

FIG. 3 shows an exemplary data set according to an exemplary embodiment.

FIG. 4 shows an exemplary data set according to an exemplary embodiment.

FIG. 9 shows an algorithm of an analytics server according to an exemplary embodiment.

FIG. 10 shows an initial graphical user interface according to an exemplary embodiment.

DETAILED DESCRIPTION

Various embodiments and aspects of the invention will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present invention.

A test can be an experiment that is conducted on a per location basis. A test location can be where the test is conducted. A pre-period is a time period before the test is conducted, whereas a post-period is a time period after the test is conducted.

The test location can be compared to one or more control locations. For location-based tests, matching a test location to a set of one or more control locations can improve measurement over measuring the full test group against the full control group. The performance of each test location can be compared to one or more control locations over the pre-period. The group or portfolio of control locations that a test location is compared to is referred to herein as a control cohort.

Test versus control analysis is commonly used to establish causality. Before implementing a change more broadly in the business world, the impact of that change may first be measured in a test. In some instances, the impact of an initiative may be less than the day-to-day fluctuations in financial performance. As a result, it can be valuable to make improvements to the identifying a control group, which can be determined by finding a group of locations that are similar to the test locations. As described in the exemplary embodiments herein, when given a test location, a group of control stores is selected using a process of genetic mutation.

Figure 1:
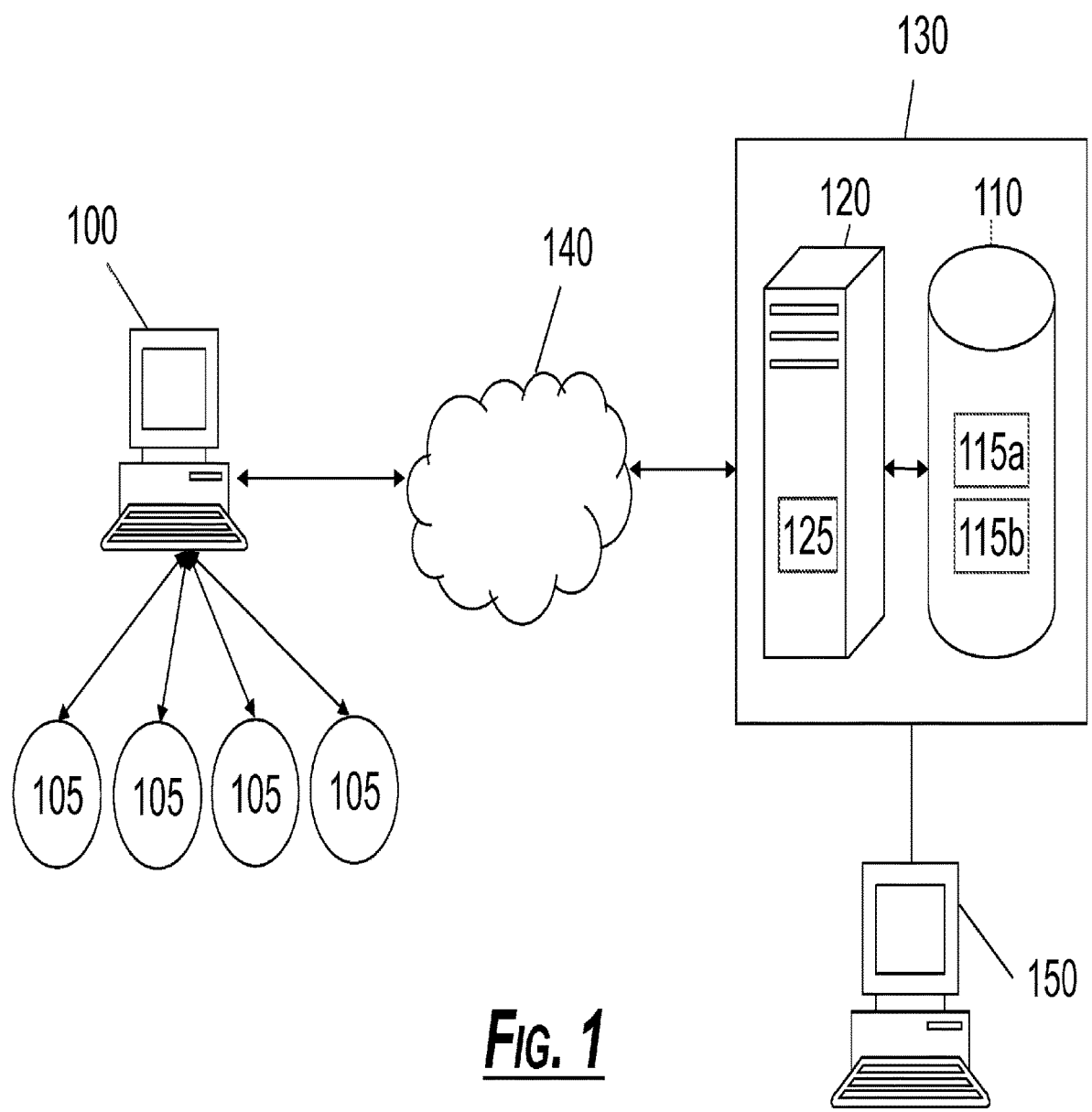
FIG. 1 shows a system overview according to an exemplary embodiment.

Referring to FIG. 1, an exemplary system diagram is shown. A client has a business network comprised of various entities 105, which may be business locations, stores, sites, students, accounts, customers, products, services, regions, patients, or other types of entities. In the exemplary embodiment, the entities represent a physical place where a company conducts business, such as a bank branch, a retail store, or a restaurant, though it is intended that the location can be any one of multiple places or sites that a company can conduct business. Further, although the exemplary embodiment often refers to the entity as a "location," it is intended that any type of entity can be used. The entities 105 may provide similar products and/or services to customers. In some embodiments, the entities 105 may be geographically dispersed.

A client computer 100 can represent one or more computers of the client, who may manage the various entities 105 or track data regarding the entities 105. In one example, for a consumer business, the client can be an organization headquarters or a marketing division for one or more entities 105 (e.g., a grocery store chain that determines which products and/or services each retailer location should provide). In some embodiments, each entity 105 can have its own client and computer 100. In other embodiment, a client and the computer 100 can be used for multiple entities 105. One or more users (not shown) may operate the computer 100. The computer 100 can be a desktop computer, workstation, laptop, personal data assistant, tablet computer, mobile phone, or any other similar computing system operated by a user. The computer 100 may use its processor to execute browser software stored in memory that enables a user to request, receive, and render information from a network 140.

The network 140 may be a shared, public, or private network and may encompass a wide area or a local area. The network 140 may be implemented through any suitable combination of wired and/or wireless communication networks. For example, network 140 may be implemented through a wide area network (WAN), local area network (LAN), an intranet, and/or the Internet. Further, network 140 may represent multiple networks, such as a wireless carrier network connected to the Internet.

The computer 100 transmits or otherwise provides historical data regarding entities 105 to a host entity 130. In this exemplary configuration, the host entity has an analytics server 120 is coupled to the database 110, though the analytics server 120 and the database 110 can be combined into a single device or each comprise multiple devices. The analytics server 120 can be a computer system such as a desktop computer, workstation, or any other similar server side computing system that performs one or more serviceside processes. The analytics server 120 has a processor that is specially programmed to perform the functionality described herein. The analytics server 120 can have an interface unit for communicating information to and from the client's computer 100 over the network 140. In some embodiments, the analytics server 120 may communicate with another server, such as a web server (not shown), that can more directly communicate over the network 140. The analytics server 120 can use its processor to execute a computer program stored in memory that can access and analyze the data stored in the database 110.

The database 110 can comprise one or more memory devices that store data and/or executable software that is used by the analytics server 120 to perform processes consistent with certain aspects described herein. The database 110 may be located external to analytics server 120 and accessible through the network 140 or other network, such as a dedicated back-end communication path. In one embodiment, the database 110 can be located at the client or another location, such as with analytics server 120. The database 110 can be populated with records about the client's historical data for various locations, sales, promotions, pricing, personnel, and the like.

The analytics server 120 may be communicatively coupled to a workstation computer 150, which is configured to present a graphical user interface that allows presentation of data and information from analytics server 120 and database 110, as well as input of data and information for transmission to analytics server 120 and database 110. The client computer 100 and the workstation computer 150 can communicate with the analytics server 120 to request analysis and view results.

In one embodiment, the computer 100 or the workstation computer 150 can communicate over the Internet 140 with the host entity's analytics server 120. The computer 100 or the workstation computer 150 may use a thin client, such as a web browser, which accesses a website hosted by the host entity 130. The client or administrator may be prompted to enter a username and password into the web browser on the computer 100 or the workstation computer 150. The client or administrator can be authenticated to access data and perform analysis of that data. Alternatively, the client may request that another entity, such as the host entity 130 perform the analysis of their business initiative, e.g., using the workstation computer 150. The systems and methods described herein can be implemented as a computer program product embodied on a computer readable medium of computer 100, analytics server 120, or the workstation computer 150, and one or more steps of the process can be implemented as a module of the computer program product.

In order to analyze a business initiative, inputs may be entered on a graphical user interface at the client computer 100, host analytics server 120, the workstation computer 150. These inputs can assist in defining the algorithm or limit the scope of the calculations. The inputs can be entered manually on the graphical user interface and/or automatically selected and entered. Inputs can include, but are not limited to, one or more test locations, a control pool, matching criteria, and a number of controls per test. Inputs regarding a test location can include one or more locations where a test is going to be conducted. Input regarding a control pool can include a plurality of control locations that are potential candidates for matched control. Inputs for matching criteria can include a set of dimensions on which a test is compared to a control.

Various types of data can be used to measure the similarity of a test location to the plurality of control locations. As a starting point, given a test location and a set of matching criteria, the system aims to find the control location that most closely matches it. The system can use many different facts for matching, so the matching criteria can be used to determine which facts are most relevant.

The database (or data store) 110 comprises records 115a, 115b or data files of performance data associated with each test and control location. Although only two records 115a, 115b are illustrated, it is intended that any number of records can be used. The records can include performance data on any time increment, such as hourly, daily, weekly monthly, quarterly, or annually. In analyzing the performance data, the analytics server 120 can aggregate data in these records so that the increment matches a requested time period. For example, if records include hourly performance data, the analytics server 120 can aggregate the data when the computer 100 or workstation 150 requests analysis in daily increments. The performance data can include sales and transaction information (e.g., price, amount, product, SKU, time, demographic information). The database 110 can also include attributes of each location in a client's network (e.g., location, size, region, address, population, identification, demographics). In one example a record or data file in database 110 comprises an identifier of a location (e.g., store number, address, zip code, phone number), performance data, and attributes of the location.

The computer 100 or workstation 150 can request that the server 120 performs test versus control analysis using the records 115a, 115b in database 110. As a component of this automated analysis, the analytics server 120 analyzes the data in a requested time period to determine outlying data points that should be excluded and dynamically updates its algorithm to account for excluded data points. In one example, sales data (or other economic performance data) for each increment (e.g., hour, day) in a designated time period (e.g., week) is analyzed for each location within a business network, and the sales data for each increment for each location can be considered a unique data point. The analytics server 120 may access a "blacklist" file 125, which may be resident on the analytics server 120. The blacklist file 125 can be used in querying the records 115a, 115b of the database 110 to determine whether data should be excluded from the analysis.

The system implements an algorithm to determine whether any outliers from a set of site and date data points in a selected time period. An outlier may be data or a data point that is statistically outside the bounds of normal behavior for a particular time period. The outliers may be data points have an unusually high or low amount of sales, transactions, or other performance metric on a particular time increment (e.g., day) that does not fit within a location's standard pattern of behavior (e.g., higher sales on the weekend versus a weekday). The data point can be an outlier because it is outside the bounds of what is "normal" for that time period or that location.

Once identified, the outlier data points can be excluded from the test versus control analysis, and the algorithm analyzing the remaining data points is adjusted as necessary to provide a more accurate read of the impact of the tested initiative.

Referring to FIG. 2, a set of performance data for various locations is shown. A database has records of historical sales data for a set of test locations 201, 202, 203, 204, 205 and control locations 206, 207, 208, 209, 210, 211, 212. A time period is selected, which is shown here as the week of March 1st through March 7th. A pre period daily average 215 and a post period daily average 220 are shown for each location.

In the exemplary embodiment, locations are designated as test locations and control locations before determining outliers. However, the systems and methods may identify outliers in the data set and then identify which locations are test or control locations. In some configurations, it may be more efficient for the computer system to first identify the test and control locations before determining outliers to remove outlier data and reduce the amount of processing by the server.

In this exemplary embodiment, test location 205 appears to have an extraneous event 230 on March 3rd. On March 3rd, the sales of 2710 was a significant decrease from the sales of test location 205 during the test period, and it is significantly less than the other sales on that date. In conventional systems, the data on March 3rd would be identified as an outlier, and the set of data of test location 205 would be excluded from the analysis. The systems and methods described herein allow the data 230 on March 3rd for test location 205 to be excluded without excluded all of the data for test location 205.

In another example, control location 211 experienced an extraneous event 240 that artificially-lifted sales on March 6th, but the impact of those sales did not render control location 211 as an outlier as a whole. The sales data for control location 211, including the extraneous event 240, would have been excluded in conventional systems. In the exemplary systems and methods, individual location date outliers are identified and then removed from the test versus control analysis.

On March 2nd, test location 201 had higher sales than all of the test and control sites, but sales data 250 is not considered an outlier because its sales were not significantly different from the sales for the remainder of the time period for test location 201.

On March 5th, test location 203 had higher sales in sales data 260 than other days during the time period. But other locations also experienced a similar increase, so event 260 is likely not an outlier. In conventional systems, a filter could have excluded this data 260 because of the change from the remainder of the period, even though it does not qualify as an outlier.

Referring to FIG. 3, for each test and control location, the sales data for each date is compared to the post period daily average 220. The ratio of the sales data for each date compared to the post period daily average 220 is shown for each date. For example, a ratio 310 for test location 201 on March 2nd is 0.949221. In another example, a ratio 320 for control location 211 on March 5th is 1.302128. The analytics server uses the ratio of each date to normalize the data, as it can be easier to compare, for each location, a ratio of the sales to the sales average instead of just comparing the sales.

Once the ratio for each location on each date is determined based upon the post period daily average 220, the analytics server determines an average ratio 330 for each date that includes every test location and control location in the set. For example, on March 2nd, the average ratio 340 for test locations 201, 202, 203, 204, 205 and control locations 206, 207, 208, 209, 210, 211, 212 is 0.93118. The analytics server uses the average ratio 330 to compare the sales data for each date.

Referring to FIG. 4, the analytics server determines a difference between the ratio of each date for each location and the average ratio (shown as average ratio 330 in FIG. 3). The analytics server uses the difference in determining which dates for which locations are outliers. This determination may be performed using Rosner's outlier test. A difference that is close to zero is likely not an outlier. For example, a difference 410 of −0.03933 on March 6th for control location 207 is likely not an outlier. A difference that is further from zero is more likely to be an outlier. For example, a difference 420 of 0.317881 on March 6th for control location 211 is likely an outlier. Similarly, in another example, a difference 430 of −0.33466 on March 3rd for test location 205 is likely an outlier.

Figure 5:
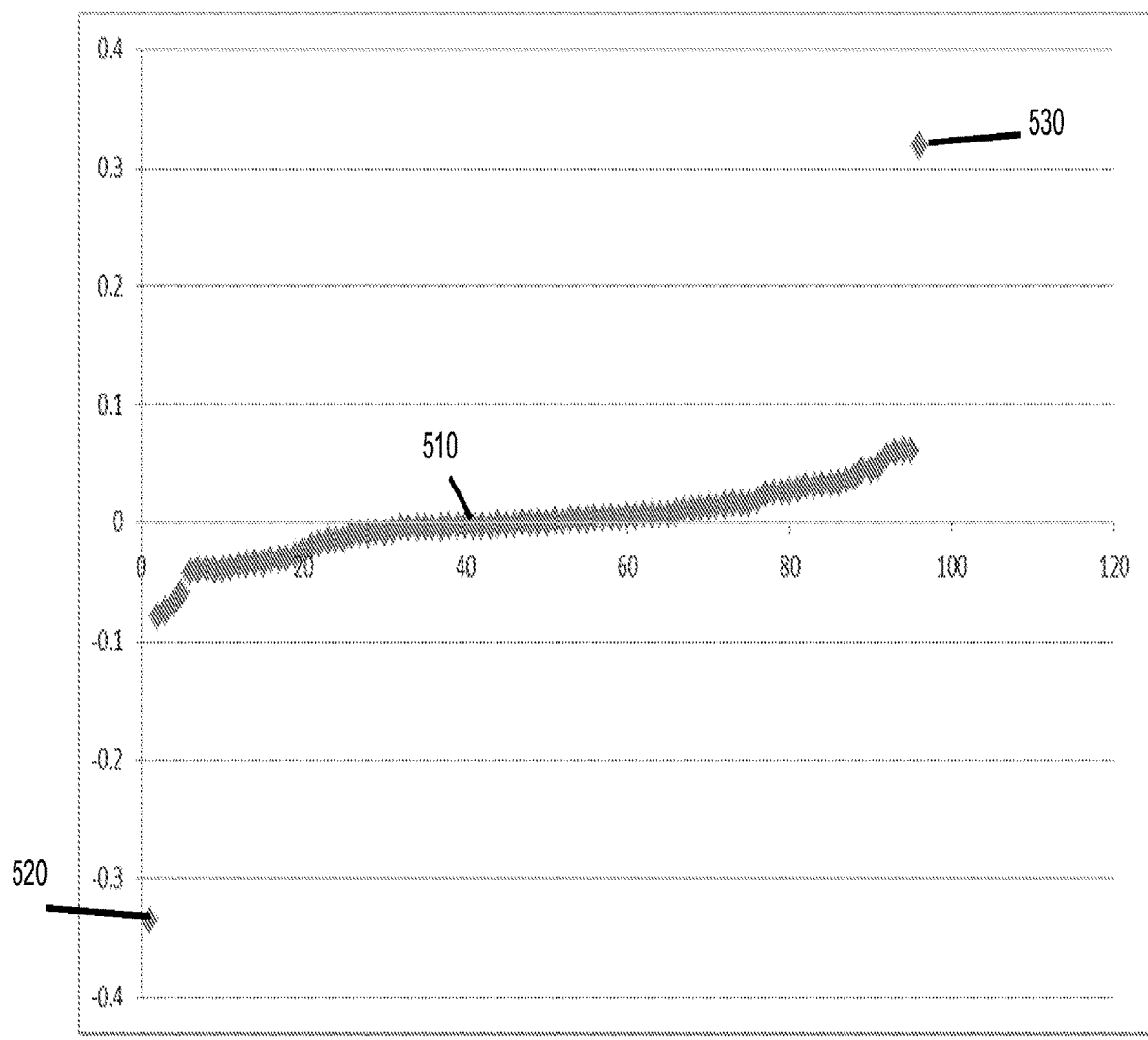
FIG. 5 shows a graph of an exemplary data set according to an exemplary embodiment.

The analytics server uses the differences calculated in FIG. 4 to conduct an outlier analysis. As shown in FIG. 5, the analytics server can execute a process that determines which dates of which locations are significantly above or below most of the data points 510 representing the sales data for the dates of these locations. For example, data point 520 represents test location 205 on March 3rd, and data point 530 represents control location 211 on March 6th. The analytics server generates a blacklist file that indicates each data point that is an outlier, and upon the implementation of certain business rules by the analytics server, the data points will be excluded, but other data points may be excluded as well and the algorithm will be modified accordingly.

Due to the large amount of data present in this type of analysis and the small discrepancies in the data, a human cannot identify which dates have outlier data. For example, in the original exemplary data set shown in FIG. 2, a visual inspection of a large amount of data cannot determine whether sales of 10,260 on March 3rd for test location 201 is an outlier when compared to sales of 4,350 on March 3rd for test location 204. As the process continues, a human still cannot identify these discrepancies, especially as the data set grows. For example, in FIG. 4, a human cannot determine whether a difference of 0.060188 in test location 201 on March 3rd is an outlier or whether a difference of 0.034782 in control location 210 on March 3rd is an outlier. The analytics server described herein can make these determinations more efficiently than previous computer-based systems and generate a user interface that displays the results based on a requested input.

Figure 6:
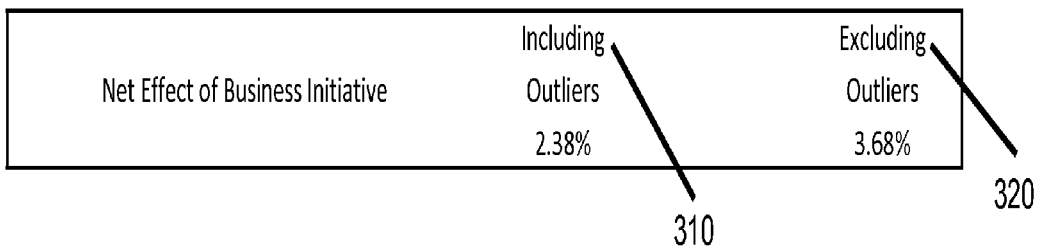
FIG. 6 shows an exemplary data set according to an exemplary embodiment.

Once the outliers are removed from the set of data, a true impact of a business initiative can be measured. Referring to FIG. 6, a set of data showing sales lift is shown. When the outliers are included 610, the net effect of the business initiative is 2.38%. When outliers are excluded 620, the net effect of the business initiative is 3.68%. If the break even point of the initiative were a 3.0% lift in sales, then the initiative may have been declared a failure using the data that includes the outliers. By excluding the outliers, the resulting lift analysis is more accurate and shows that the true impact is a lift in sales that exceeds the break even point.

Figure 7:
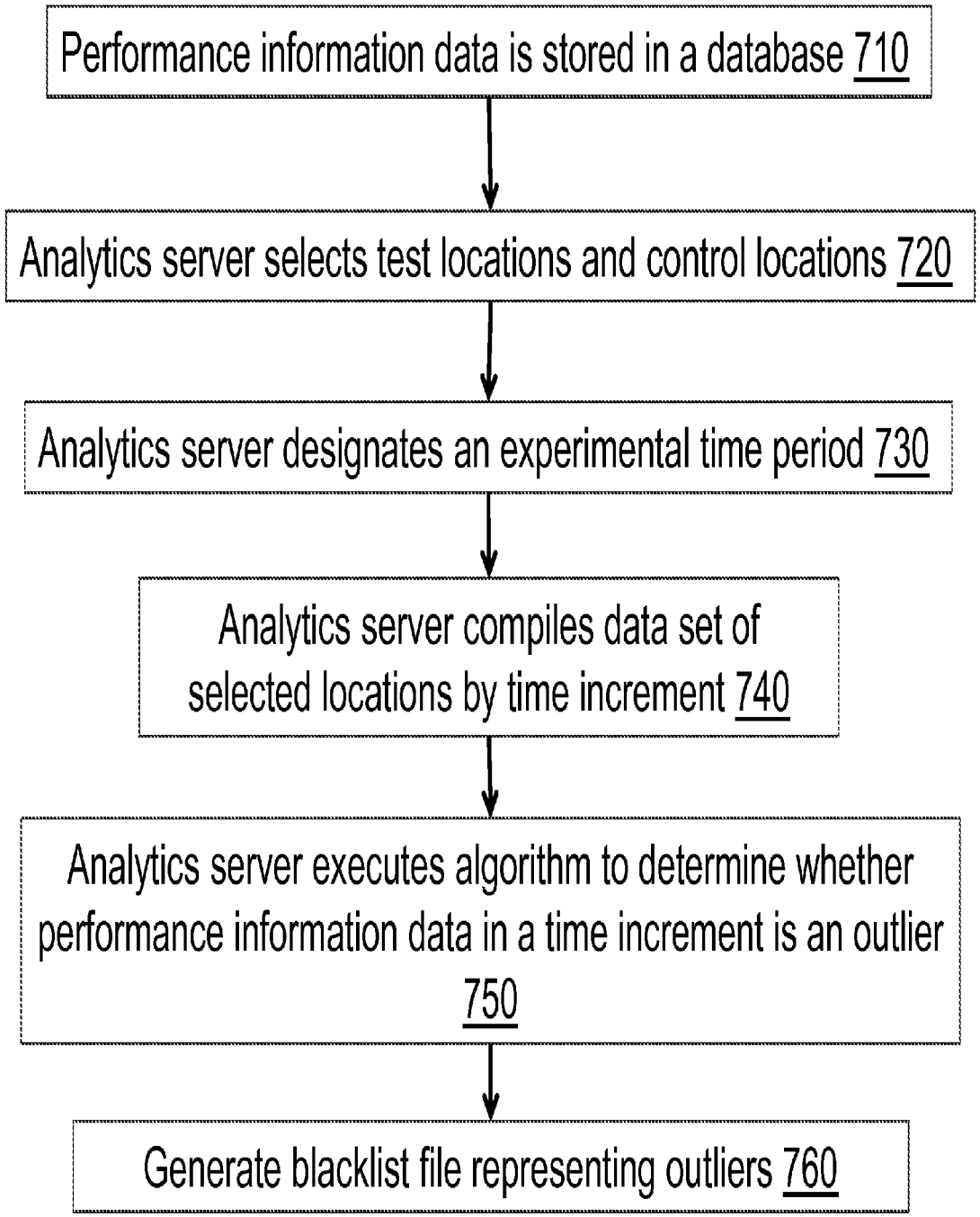
FIG. 7 shows an algorithm of an analytics server according to an exemplary embodiment.

Referring to FIG. 7, an exemplary method for improving the accuracy of a computer system by generating a blacklist file for use in performing a test versus control analysis is shown. Outlier data points are identified and removed from a data set, and the analysis is performed without those particular outliers.

In step 710, the analytics server stores performance information data about a plurality of locations in a network in records in a database. The performance information data may include total sales data for a product, product suite, business unit, or a location. The performance information data may include gross profit data for a product, product suite, business unit, or a location. The performance information data may be stored in increments, such as hourly, daily, weekly, monthly, quarterly, or annually.

In step 720, the analytics server selects a plurality of test locations and control locations from the plurality of locations. The analytics server may select one or more test locations and one or more control locations.

In step 730, the analytics server designates an experimental time period during which an experiment has been conducted at the potential test location. The analytics server may receive a selection of a time period from a user computing device. Alternatively, the analytics server may automatically determine when an experiment has occurred. The analytics server determines which performance information data in the database is designated for use in the experimental time period.

In step 740, the analytics server compiles a data set of performance information data associated with each potential test and control location by discrete increments (or subportions) of the designated experimental time period. For example, if the experimental time period is July 1st through July 7th, then the computer system will extract performance information data associated with each potential test and control location during July 1st and July 7th. The performance information data may be stored on a periodic basis (e.g., hourly basis or a daily basis), and the analysis may be based upon a particular increment within the experimental test period. In this example, even if the performance information data is stored on an hourly basis, the extracted performance information data can be compiled on a daily basis such that there is performance information data for each day for each location between July 1st and July 7th.

In step 750, the analytics server executes an algorithm that determines whether an amount of performance within a discrete increment at an individual location represents an outlier with respect to all of the other discrete increments within the data set.

In step 760, the analytics server generates a blacklist file that includes data representing a discrete increment of time for a location that represents outlier data. The blacklist file can be used in a test and control analysis to modify a data set and dynamically adjust the algorithm in view of the modified data set.

Figure 8:
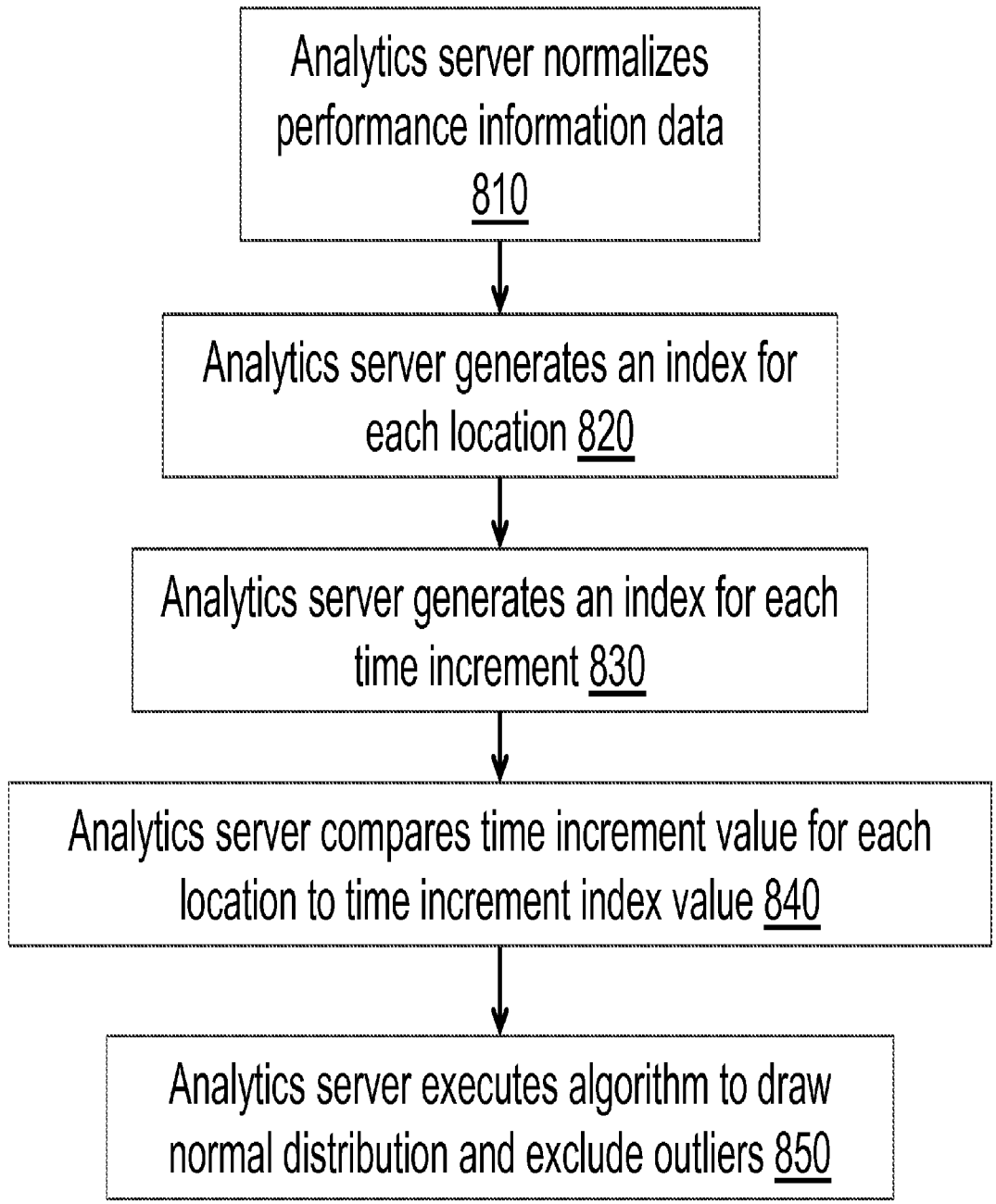
FIG. 8 shows an algorithm of an analytics server according to an exemplary embodiment.

Referring to FIG. 8, a computer-implemented algorithm for excluding outliers is shown. In step 810, the analytics server normalizes the performance information data. In an exemplary embodiment, the server can normalize the performance information data by taking a natural log of the performance information data. In another example, the analytics server can normalize the data by taking a square root of the performance information data. This normalization step may be optional.

In step 820, the analytics server generates an index value for each location. The analytics server can compare the normalized data to a mean average for the particular location. In one embodiment, the mean average can be based on an average of each time increment data for the location. In another embodiment, the mean average can be based upon a post period daily average. The index value can be a ratio that represents the comparison of the normalized data to the mean average, as shown in FIG. 3.

In step 830, the analytics server generates an average index value for each time increment (e.g., each day), using the index value data generated in step 820 for each location. The average index value for each time increment can be a mean average of the performance data for each location during that time increment, as shown in FIG. 3.

As a result of steps 820, 830, the performance information data has been normalized by location and by time increment. In step 820, the data was compared to an average for that location, and in step 830, the data was compared to an average for that time increment. The data point can be an outlier because it is outside the bounds of what is "normal" for that time period or that location, or both the time period and location. The normalization of location and time increment transforms the data set such that the outliers can be identified in any of these situations.

In step 840, the analytics server compares the indexed value for each time increment for each location to the index value representing an average for each time increment. The comparison can be performed in various ways. In one embodiment, this comparison can be performed by determining a difference, as shown in FIG. 4. In another embodiment, this comparison can be performed by calculating a standard deviation based on (50–mean average/standard deviation). The resulting data is then used to determine whether any outliers are present.

In step 850, the analytics server can execute an algorithm to draw a normal distribution and exclude any outliers. One method of determining whether a discrete increment represents an outlier uses Rosner's or Grubb's outlier test. Rosner's outlier test can remove a series of data that is farthest from a mean and recompute until it has been determined that there are no more significant outliers in the data set. Rosner's outlier test can be executed until it reaches a predetermined significance level (e.g., 90%, 95%, 99%), whereby the test is executed until this parameter is obtained. Another parameter may include the size of the distribution to determine what qualifies as an outlier. Other tests, such as Dixon's test, may be used to identify outliers.

When the analytics server identifies an outlier, the analytics server alters the data record in the database to designate the particular performance information data that is identified as an outlier as a "blackout" date. The analytics server generates a blackout list file (e.g., a DLL file) that includes any data points (a particular time increment for a particular location) where the performance information data is identified as an outlier. When the analytics server performs analysis of the performance information data, the analytics server queries the database (e.g., using a SQL query) and identifies the data that is designated on the blackout list so that this data can be excluded from the analysis. Alternatively, the analytics server can duplicate the data from the database and remove the performance information data from the duplicated data record.

The discrete time increment having outlier data can be extracted or not included in the analysis. That particular time increment is not replaced with alternative data. Accordingly, the algorithm must dynamically adjust to account for a fewer number of data points in a particular time increment or for a particular location. For example, when a time period has data from each day over a 30 day period, and a first location has one day with outlier data, that day will be excluded, whereby 29 days remain for analysis. A second location has three days with outlier data, so those three days must be excluded, whereby only 27 days remain for analysis. As a result, the server must dynamically adjust the algorithm to account for the various data points in the first location and second location, each of which may have different amounts of data. Without dynamically adjusting the algorithm to account for the removal of outliers, the server will not provide accurate results.

When the analytics server determines that the blackout date for an outlier in the blacklist file is for a test location, then the particular blackout date for the test location is not used in a test versus control analysis, and the analytics server can also exclude all control location data for that date as well. For example, in a 52 week period, the analytics server determines that week 30 of a test location is an outlier, so the analytics server will perform a test versus control analysis using the remaining 51 weeks without any test or control location data for week 30.

When the analytics server determines that the blackout date for an outlier in the blacklist file is for a control location, then the particular blackout date for the control location is excluded from the analysis. For that particular date, only the remaining control locations are compared. For example, if there are 10 control locations for March 3rd, and one control location has performance data where the analytics server has indicated that it is an outlier, then only the performance data remaining nine control locations will be used in the analysis of March 3rd.

The analytics server analyzes the comparative performance information data associated with test locations against the performance information data associated with the control locations during the experimental time period without regard to the performance information data in discrete increments during the experimental time period for individual test or control locations that have been identified as outliers.

Although the exemplary embodiment recites the improvement of a test versus control analysis by automatically removing outliers, the systems and methods described herein can also be applied to identifying problematic data. For example, when the analytics server identifies that a data point is an outlier, this identification can be a trigger that causes a notification or generation of a report that identifies the data point for further analysis. The notification or report can be presented on a user interface of a user computing device. The outlier data can represent data that has been inputted incorrectly, missing data, partial data, multiples of data, data from numerous time increments, or other faulty data. For example, when analyzing sales of a store, problematic data may include days when there are zero sales (and sales are expected), half-day sales, and double sale days. A store with problematic data can be analyzed to determine the basis for the outlying data.

Referring to FIG. 9, an exemplary algorithm of an analytics server is shown. The analytics server may receive an instruction to begin execution of this algorithm based upon an instruction received from the activation of a link or other computer-generated request from an electronic document (e.g., web page) displaying a user interface on a client computing device, as shown in FIG. 10. Upon receiving an input of data representing parameters of the algorithm, a request to perform a test versus control analysis can instruct the execution of this dynamic algorithm, including an identification of any outliers and the reconfiguration of the algorithm when the outliers are removed.

In step 910, the analytics server compiles a data set from a database of performance information data for a plurality of locations within a selected time period, wherein the performance information data is arranged in discrete time periods within the selected time period. In step 920, the analytics server normalizes the data set of performance information data during the selected time period. In step 930, the analytics server generates a first index value for the performance information data of the normalized data set for each location. In step 940, the analytics server generates a second index value for the performance information data of the normalized data set for each discrete time period. In step 950, the analytics server executes an outlier algorithm to determine any discrete time period having performance information data that represents an outlier. In step 960, the analytics server generates a blacklist file representing each discrete time period in the data set having performance information data that represents an outlier. In step 970, the analytics server selects a new data set based upon a query of the database for performance information data during the discrete time periods during the selected time period that are not listed on the blacklist file as representing an outlier. In step 980, the analytics server modifies an algorithm for analyzing an initiative based upon the selection of the new data set to exclude any discrete time period where the performance information data represents an outlier. In step 990, the analytics server executes the modified algorithm to analyze the initiative at the plurality of locations.

Figure 11:
FIG. 11 shows a generated graphical user interface according to an exemplary embodiment.

The analytics server generates a new user interface (e.g., a web page) that displays the results of this modified algorithm, and the user interface is transmitted for display on the client computing device that requested the analysis, as shown in FIG. 11.

The functionality described herein can be implemented by numerous modules or components that can perform one or multiple functions. Each module or component can be executed by a computer, such as a server, having a non-transitory computer-readable medium and processor. In one alternative, multiple computers may be necessary to implement the functionality of one module or component.

Unless specifically stated otherwise as apparent from the following discussion, it is appreciated that throughout the description, discussions utilizing terms such as "processing" or "computing" or "calculating" or "determining" or "measuring" or "selecting" or "displaying" or "identifying" or "detecting" or the like, can refer to the action and processes of a data processing system, or similar electronic device, that manipulates and transforms data represented as physical (electronic) quantities within the system's registers and memories into other data similarly represented as physical quantities within the system's memories or registers or other such information storage, transmission or display devices.

The exemplary embodiments can relate to an apparatus for performing one or more of the functions described herein. This apparatus may be specially constructed for the required purposes, or it may comprise a specially programmed computer selectively activated or reconfigured by a computer program stored in the computer. Such a computer program may be stored in a machine (e.g. computer) readable storage medium, such as, but is not limited to, any type of disk including floppy disks, optical disks, CD-ROMs and magnetic-optical disks, read only memories (ROMs), random access memories (RAMs) erasable programmable ROMs (EPROMs), electrically erasable programmable ROMs (EEPROMs), magnetic or optical cards, or any type of media suitable for storing electronic instructions, and each coupled to a bus.

The exemplary embodiments described herein are described as software executed on at least one server, though it is understood that embodiments can be configured in other ways and retain functionality. The embodiments can be implemented on known devices such as a personal computer, a special purpose computer, cellular telephone, personal digital assistant ("PDA"), a digital camera, a digital tablet, an electronic gaming system, a programmed microprocessor or microcontroller and peripheral integrated circuit element(s), and ASIC or other integrated circuit, a digital signal processor, a hard-wired electronic or logic circuit such as a discrete element circuit, a programmable logic device such as a PLD, PLA, FPGA, PAL, or the like. In general, any device capable of implementing the processes described herein can be used to implement the systems and techniques according to this invention.

It is to be appreciated that the various components of the technology can be located at distant portions of a distributed network and/or the Internet, or within a dedicated secure, unsecured and/or encrypted system. Thus, it should be appreciated that the components of the system can be combined into one or more devices or co-located on a particular node of a distributed network, such as a telecommunications network. As will be appreciated from the description, and for reasons of computational efficiency, the components of the system can be arranged at any location within a distributed network without affecting the operation of the system. Moreover, the components could be embedded in a dedicated machine.

Furthermore, it should be appreciated that the various links connecting the elements can be wired or wireless links, or any combination thereof, or any other known or later developed element(s) that is capable of supplying and/or communicating data to and from the connected elements. The term module as used herein can refer to any known or later developed hardware, software, firmware, or combination thereof that is capable of performing the functionality associated with that element. The terms determine, calculate and compute, and variations thereof, as used herein are used interchangeably and include any type of methodology, process, mathematical operation or technique.

The embodiments described above are intended to be exemplary. One skilled in the art recognizes that there are numerous alternative components and embodiments that may be substituted for or included in the particular examples described herein and such additions or substitutions still fall within the scope of the invention.

What is claimed is:

1. A method comprising:
    compiling, by a server, a dataset comprising performance data of a plurality of locations within a time period, wherein the performance data is arranged based on a plurality of corresponding discrete time periods within the time period;
    iteratively executing, by the server, an outlier protocol to remove outlier data by:
        generating, based on the performance data, a first index value for each location of the dataset within each discrete time period by comparing the performance data of each location within each discrete time period to a performance average for that location;
        generating, based on the performance data, a second index value for each location within each discrete time period, the second index value representing a first index average for each location within each discrete time period;
        identifying at least one discrete time period by comparing second index value for each location with other second index values for other locations;
        removing performance data associated with the identified discrete time period, wherein the server iteratively executes the outlier protocol until it reaches a predetermined outlier threshold;
    modifying, by the server, an algorithm for analyzing an initiative by removing the at least one discrete time period;
    executing, by the server, the modified algorithm to analyze the initiative for at least one location within the plurality of locations; and
    displaying, by the server on a graphical user interface, data representing analysis of the initiative, the graphical user interface excluding outlier performance data.

2. The method of claim 1, further comprising:
    normalizing, by the server, performance data using a predetermined normalizing protocol prior to generating the first or the second index.

3. The method of claim 2, wherein the predetermined normalizing protocol comprises calculating a natural log of the performance data or calculating a square root of the performance data.

4. The method of claim 1, wherein the time period is a post-period or a pre-period for a location.

5. The method of claim 1, wherein the server modifies the algorithm to exclude a location associated with the identified discrete time period.

6. The method of claim 1, wherein the performance data comprises at least one of sales data and gross profit data.

7. The method of claim 1, wherein the plurality of discrete time periods is selected from a group consisting of an hour, a day, a week, a month, a quarter, and a year.

8. The method of claim 1, wherein the plurality of locations comprises at least one test location and at least one control location; wherein the server execute the modified algorithm to identify an initiative associated with a control location with respect to performance data of a test location.

9. The method of claim 1, wherein the graphical user interface comprises a line graph illustrating the performance data for a location and the performance location associated with the identified discrete time period.

10. A computer system comprising:
   a plurality of locations where each location is associated with performance data, wherein the performance data is arranged based on a plurality of corresponding discrete time periods within a selected time period;
   a server in communication with the plurality of locations, the server configured to:
      compile a dataset comprising performance data of a plurality of locations within a time period;
      iteratively execute an outlier protocol to remove outlier data by:
         generating, based on the performance data, a first index value for each location of the dataset within each discrete time period by comparing the performance data of each location within each discrete time period to a performance average for that location;
         generating, based on the performance data, a second index value for each location within each discrete time period, the second index value representing a first index average for each location within each discrete time period;
         identifying at least one discrete time period by comparing second index value for each location with other second index values for other locations;
         removing performance data associated with the identified discrete time period,
         wherein the server iteratively executes the outlier protocol until it reaches a predetermined outlier threshold;
      modify an algorithm for analyzing an initiative by removing the at least one discrete time period;
      execute the modified algorithm to analyze the initiative for at least one location within the plurality of locations; and
      display, on a graphical user interface, data representing analysis of the initiative, the graphical user interface excluding outlier performance data.

11. The system of claim 10, further comprising:
   normalizing, by the server, performance data using a predetermined normalizing protocol prior to generating the first or the second index.

12. The system of claim 11, wherein the predetermined normalizing protocol comprises calculating a natural log of the performance data or calculating a square root of the performance data.

13. The system of claim 10, wherein the time period is a post-period or a pre-period for a location.

14. The system of claim 10, wherein the server modifies the algorithm to exclude a location associated with the identified discrete time period.

15. The system of claim 10, wherein the performance data comprises at least one of sales data and gross profit data.

16. The system of claim 10, wherein the plurality of discrete time periods is selected from a group consisting of an hour, a day, a week, a month, a quarter, and a year.

17. The system of claim 10, wherein the plurality of locations comprises at least one test location and at least one control location; wherein the server execute the modified algorithm to identify an initiative associated with a control location with respect to performance data of a test location.

18. The system of claim 10, wherein the graphical user interface comprises a line graph illustrating the performance data for a location and the performance location associated with the identified discrete time period.

* * * * *